Aug. 29, 1961   P. J. VAUGHAN   2,998,341
LAMINATED PRODUCTS
Filed April 21, 1958

INVENTOR.
PAUL J. VAUGHAN
BY
*P. L. Miller*
ATTORNEY

United States Patent Office 2,998,341
Patented Aug. 29, 1961

2,998,341
LAMINATED PRODUCTS
Paul J. Vaughan, Cuyahoga Falls, Ohio, assignor to The Goodyear Tire & Rubber Company, Akron, Ohio, a corporation of Ohio
Filed Apr. 21, 1958, Ser. No. 729,655
16 Claims. (Cl. 154—124)

This invention relates to a laminated product and its manufacture and, more particularly to a laminated product with a layer of polyester having on each face thereof a layer of rubber hydrochloride.

Rubber hydrochloride film is a well-known film, useful for wrapping foods and for other purposes. It has good moisture resistance and good heat-sealing properties. However, some problems have been encountered in making oriented rubber hydrochloride film and using it. Thus, for example, in the usual manufacture of oriented, heat shrinkable rubber hydrochloride film, there is a tendency for the freshly made film to shrink as it is being wound up into a roll, which causes bagginess and wrinkles and makes it difficult to produce a finished roll of flat profile. Also, rubber hydrochloride film is not sufficiently stiff to be used on some commercial automatic packaging machines.

It is an object of the present invention to avoid some of the difficulties encountered with previously known rubber hydrochloride film. Another object is to provide an improved film for wrapping foods and for other purposes. Another object is to provide a film having an excellent combination of properties, including very good appearance. Still another object is to provide a film which can be used on commercial automatic packaging machines. Other objects and advantages of the invention will become apparent as the description proceeds.

According to the invention, a layer of polyester film is laminated between two layers of rubber hydrochloride film and the laminated product is stretched to biaxially orient it.

Figure 1:
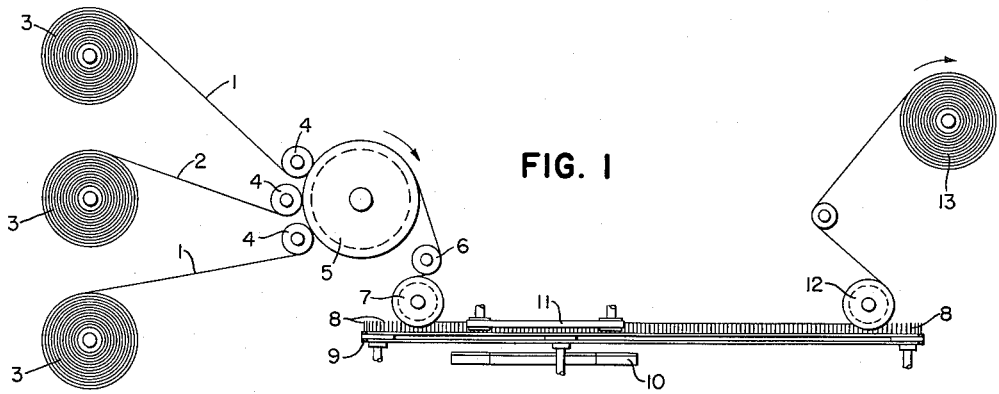
Figure 2:
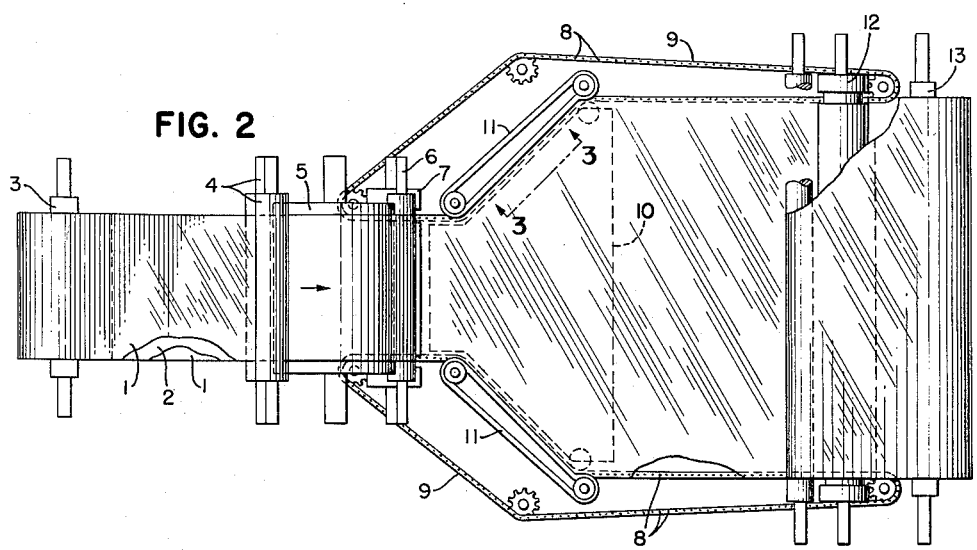
Figure 3:
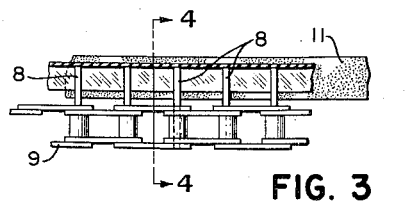
Figure 4:
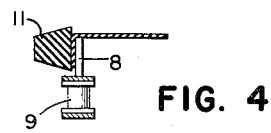

The practice of the invention is conveniently illustrated by reference to the accompanying drawing in which:

FIGURE 1 is a semi-diagrammatic elevation of apparatus for making the laminated product.
FIGURE 2 is a plan view of the apparatus.
FIGURE 3 is a sectional view taken on the line 3—3 in FIGURE 2, and
FIGURE 4 is a sectional view taken on the line 4—4 in FIGURE 3.

Referring to the drawing, two sheets or webs 1 of unoriented rubber hydrochloride film 0.001 inch thick and a sheet or web 2 of unoriented polyester film (for example an ethylene terephthalate-isophthalate copolystr containing 60 percent ethylene terephthalate units and 40 percent ethylene isophthalate units) 0.0015 inch thick are fed from supply rolls 3 under pressure of smoothing rolls 4 onto a rotating, heated laminating roll or drum 5 maintained at a temperature of about 230° F., with the polyester film between the two rubber hydrochloride films. The laminating temperature is determined primarily by the rubber hydrochloride and can be varied from about 220 to 240° F., with slightly lower temperatures being usable with plasticized rubber hydrochloride. If the temperature is too low, bonding of the films will not take place. If the temperature is too high, the rubber hydrochloride will tend to decompose. The several layers are held in snug contact with each other and with the heating roll and thereby are heated to a temperature at which they are fused and laminated to each other. The laminated sheet or film then advances to a take-off roll 6, which is held at a temperature of about 170° F. and adjusts the temperature of the laminate prior to stretching it. This temperature is determined primarily by the polyester and must be sufficiently above the second order transition temperature or glass temperature of the polyester so that the sheet or film can be stretched readily. In the case of crystallizable polyesters, the temperature should be below the minimum crystallization temperature. A suitable temperature range is about 10 to 45° F. above the second order transition temperature of the polyester. The sheet or film then passes to a longitudinal stretching roll 7, which has a surface speed about three times that of the preceding rolls. As the longitudinally stretched film or sheet leaves the roll 7, its edges are folded over the pins 8 of tentering chains 9. The pins 8 are blunt so as not to tear the sheet or film. The advancing sheet then passes over a heated plate 10, to maintain the sheet at a suitable stretching temperature, as explained above, while the tentering chains diverge thereby stretching the sheet laterally to about three times the original width. Belts 11 hold the edges of the sheet snugly against the pins as the tentering chains diverge. The biaxially stretched sheet is then carried on the pins to a stripping roll 12. The folded edges of the sheet are then trimmed off by any of various known devices (not shown) and the sheet goes to a wind-up 13.

In the foregoing description the laminated sheet was given a balanced biaxial stretching of three times the original dimension in each direction. It can be stretched more or less than this amount. Also, it can be stretched more in one direction than the other, or can be stretched in only one direction. In usual practice, it will be stretched to at least twice the original length in each direction. The preferred treatment is to biaxially stretch to at least three times the original length in each direction.

The polyester films used in the invention can be either of two kinds. One kind is random ethylene terephthalate-ethylene isophthalate copolyesters in which the ethylene terephthalate units comprise from 90 to 15 percent of the sum of the ethylene terephthalate and ethylene isophthalate units in the copolyester. Such polyesters and their preparation are described in copending application Serial No. 413,722, filed March 4, 1954, now Patent No. 2,965,613. Copolyesters in which the ethylene terephthalate units comprise from 90 to 70 percent of the sum of the ethylene terephthalate and ethylene isophthalate units are crystallizable and therefore can be "heat-set" after they are stretched and oriented. In order that they be free from haziness or cloudiness, they should be amorphous at the start and should not crystallize appreciably until they have been at least partially oriented. As the proportion of ethylene terephthalate units increases, the rate of crystallization and the total amount of crystallization obtainable increase. Therefore, if a high degree of "heat-setting" is desired, a polymer with a relatively high proportion of ethylene terephthalate units is used. Copolyesters in which the ethylene terephthalate units comprise from 60 to 15 percent of the sum of the ethylene terephthalate and ethylene isophthalate units are substantially non-crystallizable and remain completely or substantially amorphous. They can be oriented by stretching but cannot be "heat-set." The polyester in which the ethylene terephthalate units comprise 60 percent of the sum of the ethylene terephthalate and ethylene isophthalate units is a preferred species.

The second type of polyester used in the invention is random copolyesters composed of from 90 to 30 percent of ethylene terephthalate units having the structural formula

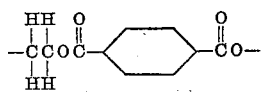

and correspondingly from 10 to 70 percent of units having the structural formula

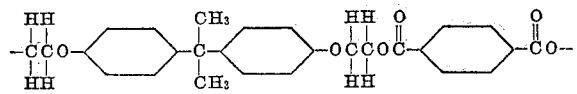

which, for convenience, can be called "B-glycol terephthalate." Such copolyesters and their preparation are described in copending application Serial No. 667,269, filed June 21, 1957. Copolyesters containing from 90 to 70 percent of ethylene terephthalate units and 30 to 10 percent of "B-glycol terephthalate" units are crystallizable and can be "heat-set" after being stretched and oriented. As in the case of the ethylene terephthalate-isophthalate copolyesters, in order to avoid haziness or cloudiness, the copolyesters should be amorphous at the start and should not crystallize appreciably until they have been at least partially oriented. As the proportion of ethylene terephthalate units increases, the rate of crystallization and the total amount of crystallization obtainable increases so that, if a high degree of "heat-setting" is desired, a polymer with a relatively high proportion of ethylene terephthalate units is used. Copolyesters containing from 60 to 30 percent of ethylene terephthalate units and 40 to 70 percent of "B-glycol terephthalate" units seem to be entirely non-crystallizable and remain completely amorphous. They can be oriented by stretching but cannot be "heat-set."

The polyester containing 60 percent of ethylene terephthalate units and 40 percent of "B-glycol terephthalate" units is a preferred species.

In both the ethylene terephthalate-ethylene isophthalate copolyesters and the ethylene terephthalate-B-glycol terephthalate copolyesters, a higher degree of heat-shrinkability is obtained with polyesters having, in the finished product, a lower amount of crystallization, or none.

The polyester film will ordinarily not contain any added compounding ingredients but pigments, fillers, coloring materials, plasticizers, etc., can be employed in appropriate cases.

Unplasticized rubber hydrochloride film is preferred for some uses, for example for food packaging, but plasticized rubber hydrochloride can also be used. Pigments, fillers, coloring materials and other compounding ingredients can be added, if desired.

The thickness of the unoriented sheets or films of the polyester and the rubber hydrochloride can be varied, as desired.

The product of the invention is useful for many purposes but it is particularly useful as a wrapping material and especially for shrink-wrapping, in which an article is wrapped and the wrapped article is heated, for example, by immersing it in warm water or blowing warm air on it to cause the wrapping material to shrink and conform to the shape of the article. This is particularly advantageous in the wrapping of many foods.

In comparison with other heat-shrinkable wrapping films, the product of the invention has a high degree of shrinkability in the useful temperature range. It yields a large area of film per pound of material. It has excellent heat-sealing properties and resistances to moisture vapor transfer. Its physical characteristics are good and it has a degree of stiffness or "body" that makes it particularly adaptable to use on automatic packaging machines.

While certain representative embodiments and details have been shown for the purpose of illustrating the invention, it will be apparent to those skilled in this art that various changes and modifications may be made therein without departing from the spirit or scope of the invention.

I claim:
1. An oriented laminated product which comprises a layer of a polyester having integrally fused to each side thereof a layer of rubber hydrochloride, said polyester being selected from the group consisting of (a) random ethylene terephthalate-ethylene isophthalate copolyesters in which the ethylene terephthalate units comprise from 90 to 15 percent of the sum of the ethylene terephthalate and ethylene isophthalate units in the copolyester and (b) random copolyesters composed of from 90 to 30 percent of units having the structural formula

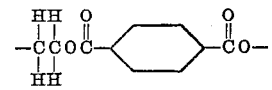

and correspondingly from 10 to 70 percent of units having the structural formula:

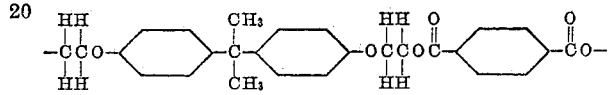

2. A product according to claim 1 which has been stretched at least twice the original length in each of two directions at right angles to each other.

3. A product according to claim 2 in which the polyester is a random ethylene terephthalate-ethylene isophthalate copolyester in which the ethylene terephthalate units comprise from 90 to 15 percent of the sum of the ethylene terephthalate and ethylene isophthalate units in the copolyester.

4. A product according to claim 3 in which the polyester is a crystallizable copolyester in which the ethylene terephthalate units comprise from 90 to 70 percent of the sum of the ethylene terephthalate and ethylene isophthalate units in the copolyester.

5. A product according to claim 4 in which the copolyester is crystalline.

6. A product according to claim 3 in which the polyester layer is amorphous.

7. A product according to claim 6 in which the ethylene terephthalate units comprise from 60 to 15 percent of the sum of the ethylene terephthalate and ethylene isophthalate units in the copolyester.

8. A product according to claim 7 in which the ethylene terephthalate units comprise 60% of the sum of the ethylene terephthalate and ethylene isophthalate units in the copolyester.

9. A product according to claim 2 in which the polyester is a random copolyester composed of from 90 to 30 percent of units having the structural formula

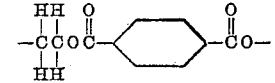

and correspondingly from 10 to 70 percent of units having the structural formula

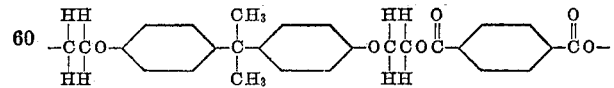

10. A product according to claim 9 in which the polyester is a crystallizable copolyester composed of from 90 to 70 percent of units having the structural formula

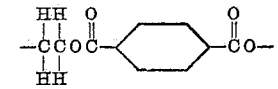

and correspondingly from 10 to 30 percent of units having the structural formula:

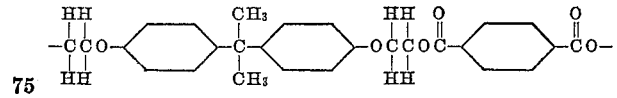

11. A product according to claim 10 in which the copolyester is crystalline.

12. A product according to claim 9 in which the polyester layer is amorphous.

13. A product according to claim 12 in which the polyester is composed of from 60 to 30 percent of units having the structural formula

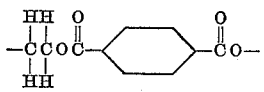

and correspondingly from 40 to 70 percent of units having the structural formula:

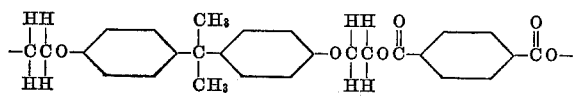

14. A product according to claim 13 in which the polyester is composed of 60 percent of units having the structural formula:

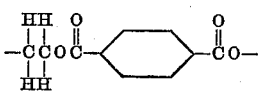

and 40 percent of units having the structural formula:

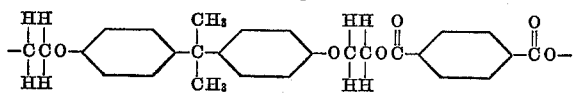

15. A method for making a heat-shrinkable film or sheet material which comprises placing between two layers of unoriented rubber hydrochloride an unoriented layer of a polyester selected from the group consisting of (a) random ethylene terephthalate-ethylene isophthalate copolyesters in which the ethylene terephthalate units comprise from 90 to 15 percent of the sum of the ethylene terephthalate and ethylene isophthalate units in the copolyester and (b) random copolyesters composed of from 90 to 30 percent of units having the structural formula:

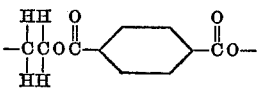

and correspondingly from 10 to 70 percent of units having the structural formula

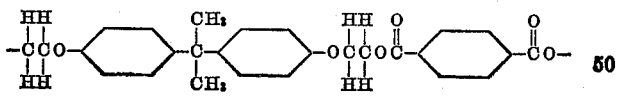

heating and pressing into face-to-face contact the thus superimposed layers, stretching the heated layers to at least twice the original dimension in at least one direction while maintaining the layers in face-to-face contact and cooling the thus laminated product.

16. A method for making a heat-shrinkable film or sheet material which comprises feeding into face-to-face relationship two layers of unoriented rubber hydrochloride and an intervening unoriented layer of a polyester selected form the group consisting of (a) random ethylene terephthalate-ethylene isophthalate copolyesters in which the ethylene terephthalate units comprise from 90 to 15 percent of the sum of the ethylene terephthalate and ethylene isophthalate units in the copolyester and (b) random copolyesters composed of from 90 to 30 percent of units having the structural formula:

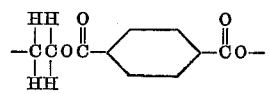

and correspondingly from 10 to 70 percent of units having the structural formula:

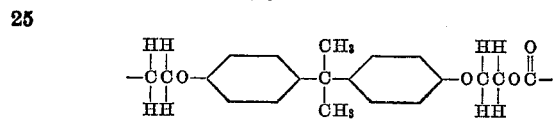

maintaining the three layers in face-to-face contact and in contact with the surface of a heated rotating roller until the layers are heated to a temperature at which they will coalesce, stretching the composite film or sheet in the direction of travel to at least three times its original dimension and then stretching it to at least three times the original dimension in the transverse direction.

References Cited in the file of this patent

UNITED STATES PATENTS

| | | |
|---|---|---|
| 2,259,362 | Young | Oct. 14, 1941 |
| 2,594,229 | Snyder et al. | Apr. 22, 1952 |
| 2,634,251 | Kass | Apr. 7, 1953 |
| 2,679,969 | Richter | June 1, 1954 |
| 2,719,100 | Banigan | Sept. 27, 1955 |
| 2,807,606 | Lincoln | Sept. 24, 1957 |

FOREIGN PATENTS

| | | |
|---|---|---|
| 678,264 | Great Britain | Sept. 3, 1952 |
| 761,064 | Great Britain | Nov. 7, 1956 |